United States Patent
Gelter et al.

(10) Patent No.: US 9,015,529 B2
(45) Date of Patent: Apr. 21, 2015

(54) SYSTEM FOR REMOTE INSTALLED SOUND COMPLIANCE TESTING

(75) Inventors: Aaron Gelter, West Jordan, UT (US); Jeffrey L. Hutchings, Lehi, UT (US); Robert Boatright, Sandy, UT (US)

(73) Assignee: Harman International Industries, Incorporated, Northridge, CA (US)

( * ) Notice: Subject to any disclaimer, the term of this patent is extended or adjusted under 35 U.S.C. 154(b) by 440 days.

(21) Appl. No.: 13/419,124

(22) Filed: Mar. 13, 2012

(65) Prior Publication Data

US 2013/0246850 A1 Sep. 19, 2013

(51) Int. Cl.
 G06F 11/00 (2006.01)
 H04L 29/08 (2006.01)
 G08B 29/12 (2006.01)

(52) U.S. Cl.
 CPC .............. *H04L 67/125* (2013.01); *G08B 29/12* (2013.01)

(58) Field of Classification Search
 CPC ................................ G06F 13/14; G06F 3/0484
 USPC .......................................................... 714/27
 See application file for complete search history.

(56) References Cited

U.S. PATENT DOCUMENTS

| | | | | |
|---|---|---|---|---|
| 6,167,537 | A * | 12/2000 | Silva et al. | 714/46 |
| 2004/0250171 | A1 * | 12/2004 | Norman | 714/39 |
| 2010/0219970 | A1 * | 9/2010 | Foisy | 340/691.1 |
| 2011/0149826 | A1 * | 6/2011 | Choi | 370/312 |
| 2011/0173498 | A1 * | 7/2011 | Hatley et al. | 714/32 |
| 2011/0283140 | A1 * | 11/2011 | Stevens et al. | 714/27 |
| 2013/0166960 | A1 * | 6/2013 | Das et al. | 714/47.1 |

OTHER PUBLICATIONS

International Organization for Standardization 7240-16, "Fire detection and alarm systems—Part 16: Sound system control and indicating equipment", Jul. 1, 2007, pp. i-47.

International Organization for Standardization 7240-19, "Fire detection and alarm systems—Part 19: Design, installation, commissioning and service of sound systems for emergency purposes", Aug. 15, 2007, pp. i-33.

Bosch, "Praesideo gets your message across, no matter what," available at http://www.boschsecurity.co.uk/content/lanquage1/html/4648_ENU_XHTML.asp, Dec. 28, 2010 (as indicated by the Internet Archive WayBack Machine (attached)).

* cited by examiner

*Primary Examiner* — Sarai Butler
(74) *Attorney, Agent, or Firm* — Alleman Hall McCoy Russell & Tuttle LLP

(57) ABSTRACT

A network communication system includes a central control system that may transmit a request packet over a network to an apparatus that is configured to operate in an alarm system. The alarm system may be configured in accordance with a standard or protocol. The request packet may include instructions that instruct the apparatus to perform one or more tests that determine whether the apparatus is compliant with the standard or protocol. The apparatus may be configured to receive the packet from over the network and perform the tests in accordance with the instructions. The apparatus may report test results of the tests to the central control system by sending a reply packet that includes the test results over the network to the central control system.

33 Claims, 6 Drawing Sheets

SYSTEM FOR REMOTE INSTALLED SOUND COMPLIANCE TESTING

BACKGROUND OF THE INVENTION

1. Technical Field

This invention relates to network communication, and more particularly to communicating packets over a network that instruct an apparatus operating in an alarm system to perform one or more tests that identify whether the apparatus is compliant in the alarm system.

2. Related Art

A building or other structure may include an alarm system that alerts habitants of an emergency or hazard. The alarm system may output visual or audio signals to alert the habitants of the emergency or hazard. Various tests may be performed on the devices or apparatuses to verify that the devices or apparatuses are functioning properly so that in the event that an emergency or hazard does occur, the devices or apparatuses may successfully alert the habitants.

SUMMARY

A network communication system may include a central control system that is configured to transmit a request packet over a network to an apparatus that is configured to operate in an alarm system. The request packet may request or instruct the apparatus to perform one or more tests that determines health, status, ability to function or functionality, and/or compliancy with a standard or protocol of the apparatus in the alarm system. The tests may be described and/or defined in the standard or protocol. In one example, the standard or protocol is the International Organization for Standardization (ISO) 7240 standard.

The central control system may identify and/or select one or more tests that the apparatus is to perform. The central control system may generate a payload to be included in the request packet. The payload may include information identifying a test that the central control system identified and/or selected. In some example configurations, the payload may also include information that identifies a category to which the test may belong and/or be associated with. Also, where a plurality or set of sub-tests and/or test options is associated with the test, the payload may also include information that identifies the sub-tests and/or test options. In some example configurations, the payload may also include information that identifies one or more times that the test or sub-tests are to be performed by the apparatus. The payload may also include information that instructs the apparatus as to the test results to be included in a reply packet. The payload may be formatted in one of various formats. In one example, the format may be a type-length-value (TLV) format.

The central control system may determine whether to generate another payload. For example, if the central control system determines that the apparatus is to perform multiple tests, the central control system may generate multiple payloads, each including information that identifies one of the multiple tests. After one or more of the payloads are generated, the central control system may be configured to packetize the payloads. Where multiple payloads are generated, a single request packet may be generated that includes the multiple payloads. Alternatively, multiple request packets may be generated to include the multiple payloads. After a request packet is generated, the request packet is transmitted over the network to the apparatus.

The apparatus may be configured to receive the request packet from over the network. The apparatus may depacketize the packet and identify the test included in the payload. Where a category is included in the payload, the apparatus may use the category to identify the test. The apparatus may be configured to perform the test. The apparatus may perform the test in accordance with information included in the payload. For example, where the payload includes sub-tests and/or test options associated with the test, the apparatus may be configured to perform the sub-tests and/or perform the test in accordance with and/or using the test options. Also, if one or more times are identified in the payload, the apparatus may perform the tests at the times identified in the payload.

After and/or while performing test and/or sub-tests, the apparatus may determine one or more test results of the performed test and/or sub-tests. The test results may indicate whether the health, status, or functionality of the apparatus in the alarm system, and/or whether the apparatus is compliant with the status or protocol. After some or all of the test results are determined, the apparatus may generate one or more payloads that includes the results. The apparatus may also be configured to packetize the payloads into one or more reply packets. After a reply packet is generated, the reply packet may be transmitted over the network to the central control system.

The central control system may be configured to receive the packet from over the network and process the packet. The central control system may identify the test results included in the reply packet. In response to identifying the test results, the central control system may be configured to output one or more output signals indicative of the test results.

The central control system may be located in a remote location from the apparatus and/or the alarm system. By transmitting the request packets to the apparatus and receiving the reply packets from the apparatus, the health, status, functionality, and/or compliancy with the standard or protocol of the apparatus in the alarm system may be determined without having to position the central control system at a location that is adjacent, next to, and/or in the vicinity of the apparatus. Communicating the request and reply packets may be advantageous, particularly where the apparatuses in the alarm system are located in areas of the building that are difficult to physically access. Also, where the alarm system includes multiple apparatuses, communicating the request packets to the multiple apparatuses simultaneously may be advantageous in that the need to manually access each device to start the test may be avoided. In addition, by communicating the request and reply packets to the multiple apparatuses from a central location, the test results may be collected in one central place, which avoids the need to manually retrieve the tests from each of the apparatuses.

Other systems, method, features and advantages will be, or will become, apparent to one with skill in the art upon examination of the following figures and detailed description. It is intended that all such additional systems, method, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
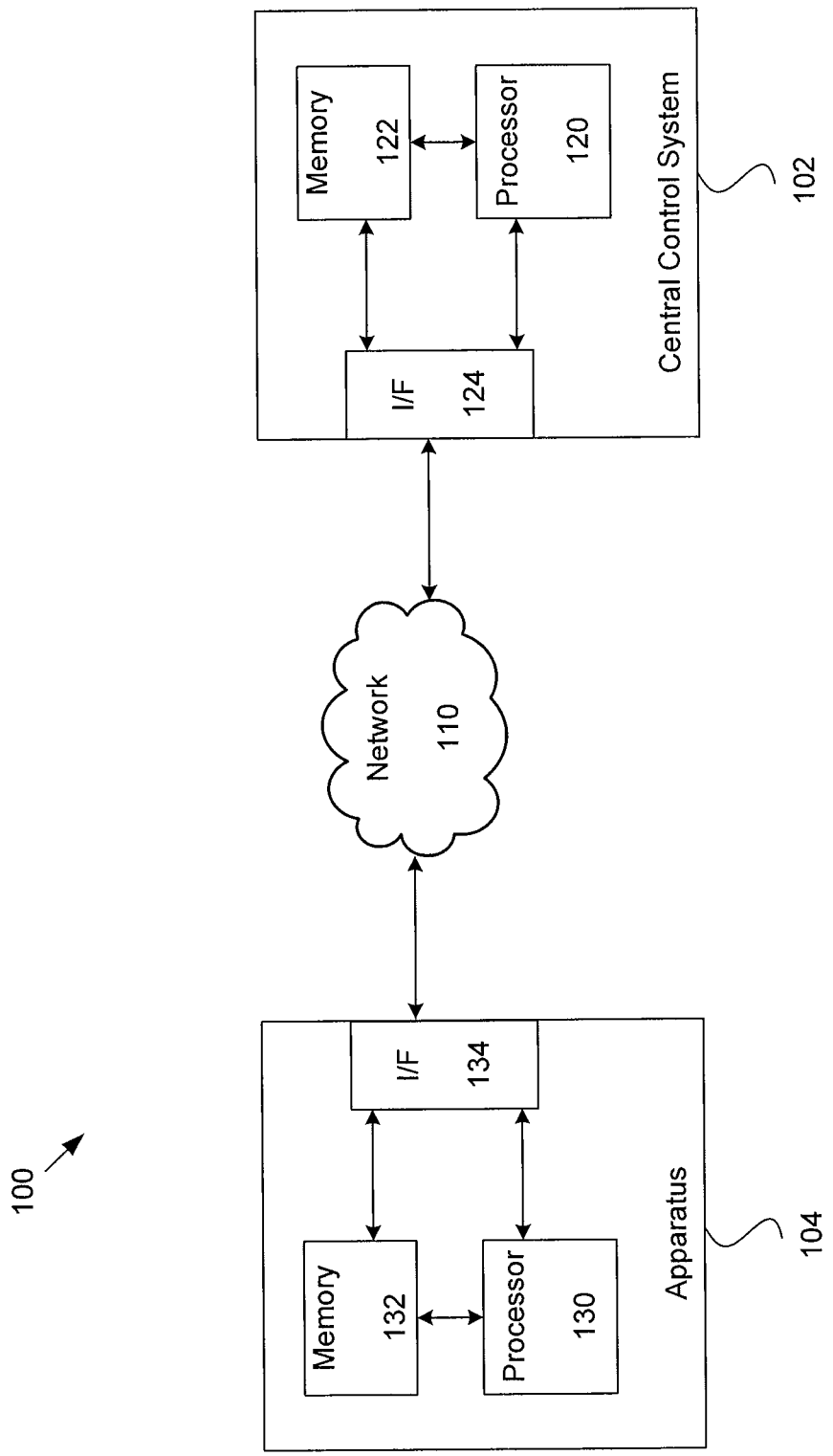
FIG. 1 is a block diagram of an example network communication system.

A building or other structure may include one or more alarm systems that are configured to detect an emergency or a hazard, such as a fire, storm, earthquake, tornado, or bomb threat, as examples. The alarm system may also be configured to alert habitants of the building of the emergency or hazard. The alarm system may alert the habitants of the emergency or hazard by broadcasting information, such as by outputting visual and/or audible signals identifiable by the habitants. In addition, the visual and/or audible signals may instruct the habitants to take certain actions. For example, the alarm system may direct the habitants to evacuate the building or to move to an identified part of the building.

The alarm system may include one or more electronic apparatuses that are configured to detect the emergency or hazard and/or output the visual and/or audible signals. The electronic apparatuses may be installed, positioned, and/or mounted in predetermined locations of the building. The electronic apparatuses may be installed in the predetermined locations to detect the emergencies or hazards inside and/or outside of the building. The electronic apparatuses may include one or more sensors or other types of information gathering devices to detect one or more of the emergencies or hazards. Additionally, the electronic apparatuses may include one or more output devices, such as loudspeakers or lights, to output the visual and/or audible signals. In some configurations, some or all of the apparatuses may be configured to both detect the hazards or emergencies, as well as output visual and/or audible signals. Alternatively, some of the apparatuses may be configured to detect the hazards or emergencies, but not output visual and/or audible signals, whereas some of the other apparatuses may be configured to output the visual and/or audible signals, but not detect the hazards or emergencies. Additionally, some or all of the apparatuses may include receiving devices, such as cameras or microphones, that are configured to receive and/or record audio and/or video data of an area surrounding and/or in the proximity to the apparatus. Various configurations are possible.

The apparatuses may be configured to communicate with each other to facilitate operation of the alarm system. For example, an apparatus that detects a hazard or emergency may be configured to communicate with one or more of the other apparatuses to notify the other apparatuses of the detected hazard or emergency. The detecting apparatus may be configured to communicate various information regarding the detected hazard or emergency, such as the type of hazard or emergency (e.g., fire, earthquake, tornado, etc.) and the location of the detecting apparatus and/or the hazard or emergency, as examples. In response to receipt of the communicated information, the other apparatuses may be configured to output signals corresponding to the detected hazard or emergency. For example, if the detected hazard is a fire, the apparatuses may be configured to output signals corresponding to the fire, such as by sounding a fire alarm or instructing habitants to evacuate the building or to avoid an area of the building where the fire is located.

The apparatuses may also be configured to communicate with one or more central control systems, which may be part of the alarm system and/or be configured to communicate with the alarm system. The central control system may be located in the building or structure having the alarm system, or may be located remotely from the building or structure. The central control system may be a stationary system or a mobile system, and/or have both stationary and mobile components. Also, the alarm system may be configured to communicate with multiple central control systems. For example, one control system may be located in the building, another control system may be located remote from the building (such as in a different building, in a different state, in a different province, or in a different country, as examples), and another control system may be mobile system. Various configurations are possible.

The central control system may be configured to communicate with the alarm system and/or the apparatuses in the alarm system via a network. The network may be a wired or wireless network. In some example configurations, the central control system may communicate with the apparatuses via a centralized network having preexisting infrastructure such as routers, access points, and cabling or other communication media. The centralized network may be used where the central control system is a stationary system locating in the building having the alarm system, as an example. Alternatively, the central operation system may communicate with the apparatuses via a decentralized or ad-hoc network with the alarm system. For example, the central control system may be a mobile device that may move from out of range of communication of an ad-hoc network to within range of the ad-hoc network. The apparatuses of the alarm system may be configured as nodes in the network. When the central control system moves within communication range of the ad-hoc network, the central control system may be configured to join and/or connect to the ad-hoc network. Also, when the central control system is moved out of communication range of the ad-hoc network, the central control system may be configured to leave and/or disconnect from the ad-hoc network. Various configurations are possible.

The central control system may be configured to communicate information with the apparatuses about and/or relating to a hazard or emergency. The central control system may be configured to receive information about a detected hazard or emergency from the apparatuses. The central control system may also be configured to process the information to take actions corresponding to the detected hazard or emergency. For example, the central control system may be configured to contact an emergency telephone number such as 911, a police department, a fire department, or a bomb squad, as examples. The central control system may also be configured to control the operation of the apparatuses and/or override communications between the apparatuses. For example, the central control system may be configured to send messages to the apparatuses that instruct the apparatuses whether to output the visual and/or audio signals, of the types of signals to output, and/or of the messages or instructions for the apparatuses to output.

The central control system may also be configured to communicate with the apparatuses to determine a status, health, ability to function, and/or functionality of the apparatuses in the alarm system. The central control system may be configured to request and/or instruct the apparatuses to perform one or more tests that are indicative of the status, health, and/or functionality of the apparatuses. The tests may simulate and/or subject the apparatuses to conditions that the apparatuses may be subjected to when installed in the building and/or in operation, such as corrosion, vibration, direct impact, indirect shock, and/or electromagnetic interference. The apparatuses may be configured to perform one or more of the tests in response to receiving the requests or instructions from the central control system. The apparatuses may also be configured to report results of the tests back to the central operations system after performing the tests.

The alarm system, one or more of the apparatuses included in the alarm system, and/or the central control system may be implemented, installed, and/or configured to operate and/or function in accordance with and/or using one or more standards or, protocols. One example standard is the International Organization for Standardization (ISO) 7240, entitled, "Fire detection and alarm systems." ISO 7240 includes multiple parts. One part (ISO 7240 Part 16) describes the requirements, test methods and performance criteria for sound system control and indicating equipment (SSCIE) for use in buildings and structures as part of a sound system for emergency purposes (SSEP). Another part (ISO 7240 Part 19) describes the design, installation, commissioning and service requirements for the SSEP.

The SSEP and/or the SSCIE may broadcast information for the protection of lives within one or more specified areas in an emergency, and to effect a rapid and orderly mobilization of occupants in an indoor or outdoor area. The SSEP and/or the SSCIE may be configured to broadcast voice announcements for emergency purposes, alert signals complying with ISO 7731, and/or evacuate signals complying with ISO 8201. The SSEP and/or the SSCIE may broadcast coded warnings, rather than sounders, sirens, or bells, which may better inform habitants of the building of the hazard or emergency and what actions the habitants should take. The SSEP and/or the SSCIE may be part of and/or may communicate with the alarm system. One or more of the apparatuses of the alarm installed in the building may be part of the SSEP and/or the SSCIE and may be installed and/or configured to operate and/or communicate under ISO 7240.

The apparatuses configured in accordance with ISO 7240 may be configured to receive information from the central control system that instructs the apparatuses to perform various actions, tests, operations, and/or functions. The actions, tests, operations, and/or functions may be in accordance, described, and/or defined with ISO 7240. The apparatuses may also be configured to send one or more reply messages that include information describing the results of the actions, tests, operations, functions, and/or any other information related to the request received from the central control system. Similarly, the central control system may be configured to send messages to the apparatuses instructing the apparatuses to perform the actions, tests, operations, and/or functions in accordance with ISO 7240. The central control system may also be configured to receive the reply messages that include the information describing the results of the actions, tests, operations, functions, and/or any other information related to the request message sent by the central control system.

FIG. 1 shows an example network communication system 100 that includes a central control system 102 that is configured to communicate with an apparatus 104 configured to operate in an alarm system. FIG. 1 shows a single apparatus 104, although other example systems 100 may include multiple apparatuses 104, each being configured to communicate with the central control system 102. Further, communication, including messages exchanged, between the central control system 102 and the single apparatus 104 as described herein may be the same as or equally applicable for communication between the central control system 102 and multiple apparatuses 104, each of the multiple apparatuses 104 being configured to perform the same, similar, or different functions or operations in the alarm system.

The central control system 102 and the apparatus 104 may communicate with each other by communicating information over and/or through a network 110. The network 110 may include any type of wired network, wireless network, or combinations thereof. The network may be configured for Ethernet communication. In addition or alternatively, the network 110 may be, include, and/or communicate through or with wide area networks (WAN), such as the Internet, local area networks (LAN), campus area networks, metropolitan area networks, or any other wireless, wired, and/or wireline networks that may allow for data communication. The network 110 may be divided into sub-networks. The sub-networks may allow access to all of the components connected to the network 110, or the sub-networks may restrict access between the components connected to the network 110. The network 110 may be regarded as a public or private network and may include, for example, a virtual private network, encryption, or any other security mechanism employed over the public Internet, or the like. Various other types of networks 110 are possible.

The information communicated between the central control system 102 and the apparatus 104 may be communicated as packets. The information may be packetized in any packet format and/or in accordance with any standard or protocol, such as Transmission Control Protocol (TCP), User Datagram Protocol (UDP), Audio Video Bridging (AVB) (such as IEEE 802.1AS-2011 (gPTP) for network timing and synchronization, IEEE 802.1Qav-2009 for queuing and forwarding streaming data, IEEE 802.1Qat-2010 ((Stream Reservation Protocol (SRP)) for reserving data stream bandwidth in a network, and/or IEEE 1722-2011 related to a possible data streaming format), or any other standard or protocol under which packets, such as Layer 2 of the Open Systems Interconnection (OSI) model may be formatted.

Figure 12:
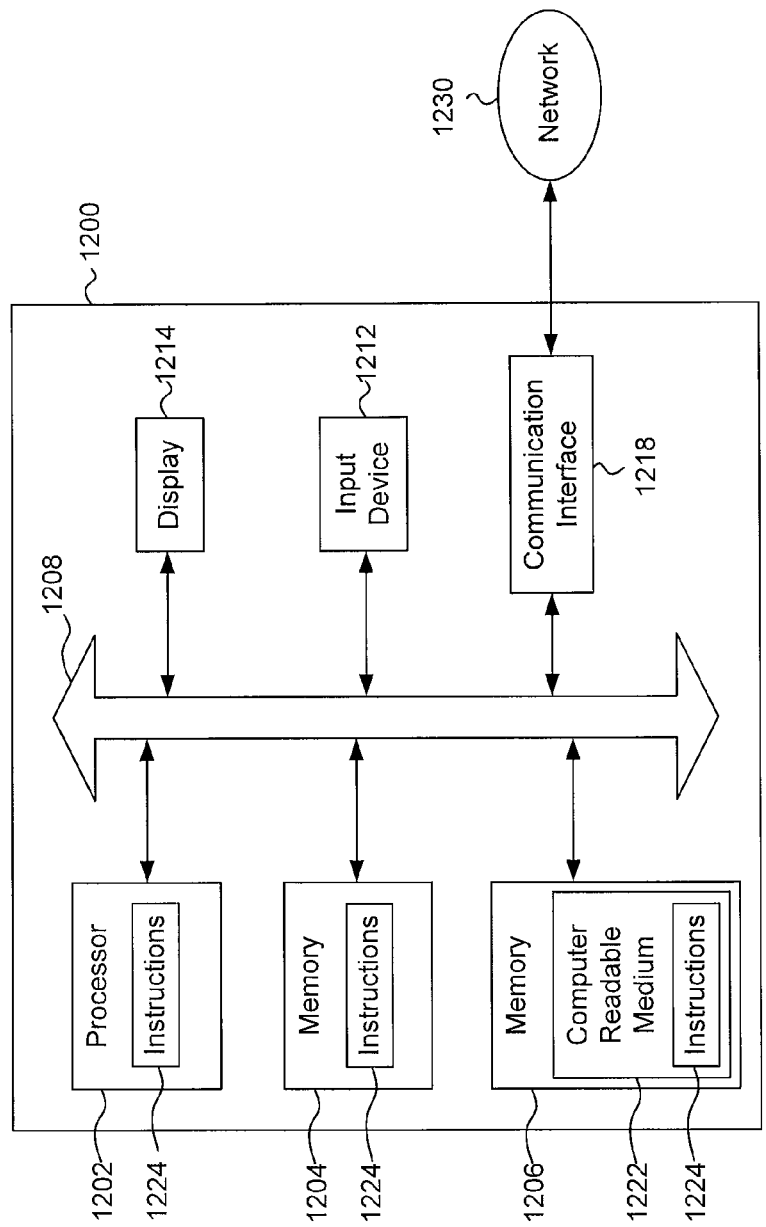
FIG. 12 is an example of a computer processing system for use with one or more components in the network communication system.

The central control system 102 may include one or more computer systems, such as one or more computer systems 1200 shown in FIG. 12. In addition or alternatively, the central control system 102 may include one or more components of the computer system 1200. For example, as shown in FIG. 1, the central control system 102 may include one or more processors 120 in communication with a memory 122. The memory 122 may be configured to store at least some of the information that identifies, describes, and/or defines the actions, tests, operations, and/or functions that the apparatus 104 may be configured to perform. The memory 122 may also be configured to store at least some of the instructions that instruct the apparatus 104 perform the actions, tests, operations, and/or functions. In some example configurations, the memory may be configured to store an application, such as a high level application, that is executable by the processor 120. When executed, the application may be able to determine the information to send over the network 110 to the apparatus 104. The application may be configured to receive one or more input signals from an input device, such as input device 1212 of the computer system 1200 shown in FIG. 12. In response to receiving the input signals, the application may determine at least some of the information to send over the network 110 to the apparatus 104. In addition or alternatively, the application may be configured to automatically determine at least some of the information to send over the network 110 and to the apparatus 104 and/or independent of one or more input signals that the application receives.

The information may include instructions that instruct the apparatus 104 to perform one or more tests that determines the status, health, or functionality of the apparatus 104. The status, health, or functionality of the apparatus 104 may identify and/or indicate whether the apparatus 104 is operable, able to function or functional, and/or capable of performing one or more of its intended functions within the alarm system. In addition or alternatively, the tests may determine and/or demonstrate the operation of the apparatus 104 before, during, and/or after environmental conditioning, which may include stabilizing the apparatus in and/or within a range of one or more of the following conditions: temperature, relative humidity, and air pressure. Where the apparatus is configured to operate in accordance with and/or using a standard or protocol, the tests may determine whether the apparatus 104 is compliant with the standard or protocol. For example, where the apparatus 104 is configured to operate in accordance with the ISO 7240 standard, the tests may determine whether the apparatus 104 is compliant with ISO 7240. The tests performed may yield and/or produce test results, which identify the status, health, or functionality of the apparatus 104 and/or whether the apparatus 104 is compliant with the standard for which it is configured. Test results indicating that the apparatus 104 is compliant with the standard may indicate that the apparatus is operating and/or functioning properly and no further action may be taken. Alternatively, test results indicating that the apparatus 104 is not compliant with the standard may indicate that the apparatus 104 is not operating properly and/or is defective, and may indicate that further action should be taken, such as repairing or replacing the apparatus 104. The information and/or instructions may identify the tests to be performed by the apparatus 104, a time or times at which to perform the tests, and/or information to be included as part of the test results to be sent back to the central control system 102. Other information may be included.

Figure 2:
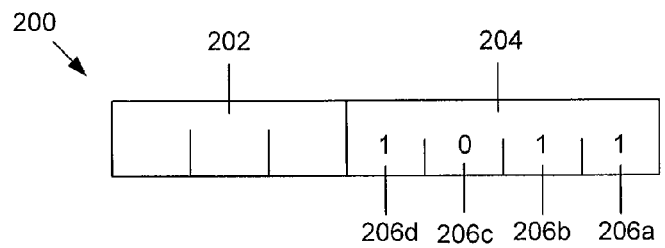
FIG. 2 is a diagram of an example format of a payload to be included in a packet sent to an apparatus configured to operate in an alarm system.
Figure 3:
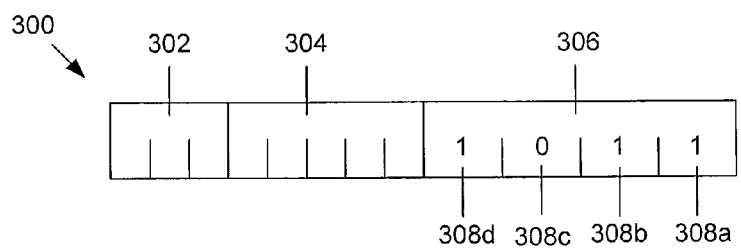
FIG. 3 is a diagram of a first alternative example format of a payload to be included in a packet sent to an apparatus configured to operate in an alarm system.
Figure 4:
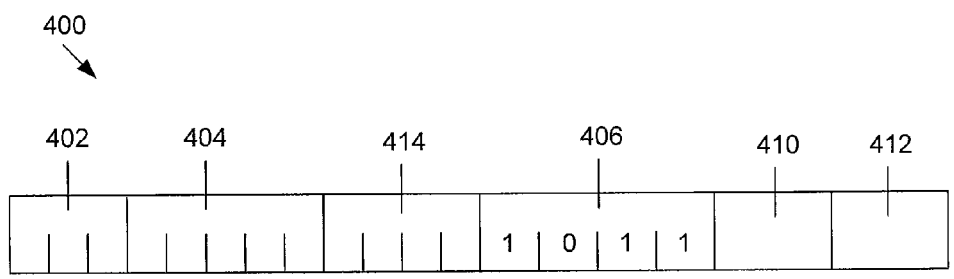
FIG. 4 is a diagram of a second alternative example format of a payload to be included in a packet sent to an apparatus configured to operate in an alarm system.

The information may be configured as a payload within a packet that is sent over the network 110 to the apparatus 104. FIGS. 2, 3, and 4 show example diagrams of example formats of the payload included in the packet that instructs or requests the apparatus 104 to perform one or more tests for health, status, functionality, and/or standard compliancy.

FIG. 2 shows a diagram of an example format of a payload 200 that includes two data fields, a first data field 202 and a second data field 204. The first data field 202 may be configured to include information, such as one or more identifiers or predetermined values that identify the payload as including instructions to instruct the apparatus 104 to perform one or more tests for health, status, functionality, and/or standard compliancy. The identifier or predetermined value included in the first data field may include of any type of values, such as binary values, hexadecimal values, decimal values, or American Standard Code for Information Interchange (ASCII) characters, as examples. In one example configuration, the first data field may include one or more identifier fields, such as one or more bit fields, that contain the identifier or predetermined value.

The second data field 204 may be configured to include information, such as one or more identifiers or predetermined values that identify one or more tests to be performed by the apparatus 104. The identifiers or predetermined values may be of any type, such as binary, hexadecimal, decimal, or ASCII, as examples. Each identifier or predetermined value may correspond to a particular test to be performed. Otherwise stated, each test that may be performed by the apparatus 104 may correspond to a predetermined location or a particular identifier field 206 in the second data field 204. A number of identifiers or predetermined values included in the second data field 204 may correspond to a number of tests that may be performed by the apparatus 104. The number of tests may be determined by the standard or protocol under which the apparatus 104 is configured. The second data field 204 may include one or more identifier fields 206, such as bit fields, that are configured to include the identifiers or predetermined values. A number of identifier fields 206 may correspond to, and/or be equal to or greater than the number of tests to be performed by the apparatus 104 and/or identified under the standard or protocol. In addition, a size or length of the second data field 204 may be determined by the number of tests that may be included in the second data field 204.

To illustrate, the second data field 204 of the example format 200 shown in FIG. 2 includes four identifier fields, 206a, 206b, 206c, 206d. One or more of the identifier fields 206a-d may correspond to a test that determines a health, status, functionality, and/or compliance with a standard or protocol of the apparatus 104. For example, identifier field 206a may correspond to a first test, Test A; identifier field 206b may correspond to a second test, Test B; sub-field 206c may correspond to a third test, Test C; and identifier field 206d may correspond to a fourth test, Test D. Tests A, B, C, and D may be predetermined tests that the apparatus 104 is configured and/or operable to perform. Additionally, where the apparatus 104 is configured in accordance with a standard or protocol, Tests A, B, C, and/or D may be defined and/or described in the standard or protocol.

In one example configuration as shown in FIG. 2, the identifier fields 206a-d may include bit-fields that contain binary values, such as a logic "1" or a logic "0" as the identifiers or predetermined values. One of the binary values may indicate that the test corresponding to the identifier field 206a-d is to be performed by the apparatus 104 and the other of the binary value may indicate that the test corresponding to the identifier field 206a-d is not to be performed by the apparatus 104. In some example configurations, logic "1" indicates that the test is to be performed, and logic "0" indicates that the test is not to be performed. To illustrate, as shown in FIG. 2, identifier field 206a includes a logic "1," indicating that the apparatus 104 is to perform Test A; identifier field 206b includes a logic "1," indicating that the apparatus 104 is to perform Test B; identifier field 206c includes a logic "0," indicating that the apparatus 104 is not to perform Test C; and identifier field 206d includes a logic "1," indicating that the apparatus 104 is to perform Test D. In other example configurations, logic "1" may indicate that the test is not to be performed, and logic "0" may indicate that the test is to be performed. In still other configurations, identifiers or predetermined values other than binary values may be used to indicate whether the test is or is not to be performed. Various configurations are possible.

FIG. 3 shows a diagram of an alternative example format of a payload 300 that includes three data fields, a first data field 302 and a second data field 304, and a third data field 306. The first data field 302 may include one or more identifiers or predetermined values that identify a test category of one or more tests that determines a health, status, functionality, and/or standard compliancy of the apparatus 104. A single test or multiple tests, and/or a plurality of sub-tests of a single test may be included and/or fall under a test category. The test category may be a predetermined test category that the apparatus 104 may be configured to identify upon receiving the packet. Where the apparatus 104 is configured to operate in accordance with a standard or protocol, the test category may be defined and/or described in the standard or protocol. The identifier or predetermined value in the first data field 302 that identifies the test category may also serve and/or function to identify that the payload 300 of the received packet as being a payload that includes instructions for the apparatus 104 to perform one or more tests that determines the health, status, functionality, and/or standard compliancy of the apparatus 104. The identifier or predetermined value included in the first data field 302 may be of any type, such as a binary, hexadecimal, decimal, or ASCII, as examples. In one example configuration, the first data field 302 may include one or more identifier fields, such as one or more bit fields, that contain the identifier or predetermined value.

The second data field 304 may include one or more identifiers or predetermined values that identify the test in the test category identified in the first data field 302 that the apparatus 104 is to perform. The test may be a predetermined test that the apparatus 104 may be configured to perform. The apparatus 104 may be configured to identify the identifier or predetermined value included in the second data field 304 and determine the test to perform based on identifying the identifier. Where the apparatus 104 is configured to operate in accordance with a standard or protocol, the test may be defined and/or described in the standard or protocol. The identifier or predetermined value included in the second data field 304 may be of any type, such as a binary, hexadecimal, decimal, or ASCII, as examples. In one example configuration, the second data field 304 may include one or more identifier fields, such as one or more bit fields, that contain the identifier or predetermined value.

The third data field 306 may include one or more identifiers or predetermined values that identify one or more sub-tests or one or more test-options (hereinafter collectively referred to as sub-tests) of the test identified in the second data field 304 that are to be performed by the apparatus 104. The sub-tests may be predetermined tests that the apparatus 104 may be configured to perform. Where the apparatus 104 is configured to operate in accordance with a standard or protocol, the sub-tests may be defined and/or described in the standard or protocol.

Each identifier or predetermined value in the third data field 306 may correspond to a particular sub-test to be performed. Each identifier or predetermined value may be positioned and/or located in one of a plurality of predetermined locations or identifier fields 308. Each location or identifier field 308 may also correspond to a sub-test. Each identifier or predetermined value may be positioned and/or located in the predetermined locations or identifier fields 308 that corresponds to the same sub-test to which the identifier or predetermined value also corresponds.

A number of identifiers or predetermined values included in the third data field 304 may correspond to a number of sub-tests that may be performed by the apparatus 104. The number of sub-tests may be defined and/or determined by the standard or protocol under which the apparatus 104 is configured. The third data field 306 may include one or more identifier fields 308, such as bit fields, that are configured to include the identifiers or predetermined values. A number of identifier fields 308 may correspond to and/or be equal to or greater than the number of sub-tests associated with the test identified in the second data field 304, and/or defined under the standard or protocol under which the apparatus 104 is configured to operate. In addition, a size or length of the third data field 306 may be determined by the number of sub-tests that may be included in the third data field 306.

To illustrate, the third data field 306 of the example format 300 shown in FIG. 3 includes four identifier fields, 306a, 308b, 308c, 308d. One or more of the identifier fields 308a-d may correspond to a sub-test that determines a health, status, functionality, and/or compliance with a standard or protocol of the apparatus 104. For example, identifier field 308a may correspond to a first sub-test, Sub-test A; identifier field 308b may correspond to a second sub-test, Sub-test B; sub-field 308c may correspond to a third sub-test, Sub-test C; and identifier field 308d may correspond to a fourth sub-test, Sub-test D. Sub-tests A, B, C, and D may be predetermined sub-tests that the apparatus 104 is configured and/or operable to perform. Additionally, where the apparatus 104 is configured in accordance with a standard or protocol, Sub-tests A, B, C, and/or D may be defined and/or described in the standard or protocol.

In one example configuration as shown in FIG. 3, the identifier fields 308a-d may include bit-fields that contain binary values, such as a logic "1" or a logic "0" as the identifiers or predetermined values. One of the binary values may indicate that the sub-test corresponding to the identifier field 308a-d is to be performed by the apparatus 104 and the other of the binary value may indicate that the test correspond to the identifier field 308a-d is not to be performed by the apparatus 104. In some example configurations, logic "1" indicates that the test is to be performed, and logic "0" indicates that the test is not to be performed. To illustrate, as shown in FIG. 3, identifier field 308a includes a logic "1," indicating that the apparatus 104 is to perform Sub-test A; identifier field 308b includes a logic "1," indicating that the apparatus 104 is to perform Sub-test B; identifier field 308e includes a logic "0," indicating that the apparatus 104 is not to perform Sub-test C; and sub-field 308d includes a logic "1," indicating that the apparatus 104 is to perform Sub-test D. In other example configurations, logic "1" may indicate that the sub-test is not to be performed, and logic "0" may indicate that the sub-test is to be performed. In still other configurations, identifiers or predetermined values other than binary values may be used to indicate whether the sub-test is or is not to be performed. Various configurations are possible.

FIG. 4 shows a diagram of an alternative example format of a payload 400 that includes six data fields, a first data field 402, a second data field 404, a third data field 406, a fourth data field 410, a fifth data field 412, and a sixth data field 414.

The first data field 402, the second data field 404, and the third data field 406 may be the same, similar, and/or correspond to the first, second, and third data fields 302, 304, 306, or be configured to contain the same or similar data as the first, second, and third data fields 302, 304, 306 of the example payload format 300 shown in FIG. 3.

The format of the payload 400 may also include a fourth data field 410, which may include one or more identifiers or predetermined values that identifies when the test identified in the second data field 404 and/or one or more of the sub-tests identified in the third data field 406 are to be performed by apparatus 104. The fourth data field 410 and/or one or more times corresponding to the test or sub-tests may be included where the central control system 102 wishes to have the apparatus 104 perform one or more of the tests or sub-tests at a specific or predetermined time, and/or at a time that is later than the time at which the apparatus 104 will receive the packet from the central control system 102. For example, the central control system may send the instruction message to the apparatus 104 during a first time, such as a time during normal business hours of the building in which the apparatus 104 is installed, but may not want the apparatus to perform the tests or sub-tests identified in the instruction message until a second time, such as a time after normal business hours (e.g., at night). The identifiers or predetermined values included in the fourth data field 410 to identify one or more times at which to perform the tests or sub-tests may be in any type, such as binary, hexadecimal, decimal, or ASCII as examples. In addition, the fourth data field 410 may include one or more identifier fields, such as bit fields, that contain the identifiers or predetermined values. A size and/or length of the fourth data field 410 may be of any size or length, and/or may depend on the identifiers and/or predetermined values included in the fourth data field 410 to identify the times.

The format of the payload 400 may also include a fifth data field 412, which may provide instructions as to the reply message that the apparatus 104 may send to the central control system 102 after performing the test and/or sub-tests. In some examples, the instructions identify and/or specify the content, such as the results or the types of results to include in the reply message. The instructions may also identify a format in which to include the content in the reply message. In addition, the instructions may identify a time at which to send the reply message. Other information may be included in and/or with the instructions. The information and/or instructions included in the fifth data field 412 may be included as any type, such as binary, hexadecimal, decimal, or ASCII as examples. A size and/or length of the fifth data field 412 may be of any size or length, and/or may depend on the information and/or instructions included in the fifth data field 412.

The format of the payload 400 may also include a sixth data field 414, which may include one or more identifiers or predetermined values that indicates and/or identifies one or more lengths or sizes of the third data field 406, the fourth data field 410, and/or the fifth data field 412. Various configurations of the sixth data field 414 are possible. For example, the sixth data field 414 may include an identifier or value that identifies a total length or size of the third data field 406, the fourth data field 410, and the fifth data field 412 that are included in the payload 400. Alternatively, the sixth data field 414 may include an identifier or predetermined value that identifies a length or size of one of or less than all of the third data field 406, the fourth data field 410, and the fifth data field 412 that are included in the payload 400. Alternatively, the sixth data field 414 may include identifiers or predetermined values that identify multiple lengths or sizes, where each identifier corresponds to and/or identifies a length or size of one of the third data field 406, the fourth data field 410, or the fifth data field 412. For example, a first identifier in the sixth data field 414 may identify a length or size of the third data field 406; a second identifier in the sixth data field 414 may identify a length or size of the fourth data field 410, and a third identifier in the sixth data field 414 may identify and length or size of the fifth data field 412. Various configurations and/or combination of configurations are possible. Also, the identifiers or predetermined values included in the sixth data field 414 may be included in any type, such as binary, hexadecimal, decimal, or ASCII as examples. In addition, the fourth data field 410 may include one or more identifier fields, such as bit fields, that contain the identifiers or predetermined values. A size and/or length of the sixth data field 414 may be of any size or length, and/or may depend on the identifiers and/or predetermined values included in the sixth data field 414 to identify one or more lengths of the third data field 406, the fourth data field 410, and/or the fifth data field 412.

In the example format of the payload 400 shown in FIG. 4, one, fewer than all, or all of the fourth data field 410, the fifth data field 412, and the sixth data field 414 may be included. For example, the format of the payload 400 may include the fourth data field 410, but not the fifth and sixth data fields 412, 414; or may include the fifth data field 412, but not the fourth and sixth data fields 410, 414; or may include the sixth data field 414, but not the fourth and fifth data fields 410, 412. Alternatively, the format of the payload 400 may include two of the fourth, fifth, and sixth data fields 410, 412, 414. Various combination of the fourth data field 410, the fifth data field 412, and the sixth data field 414 being included in the example format of the payload 400 are possible.

Figure 5:
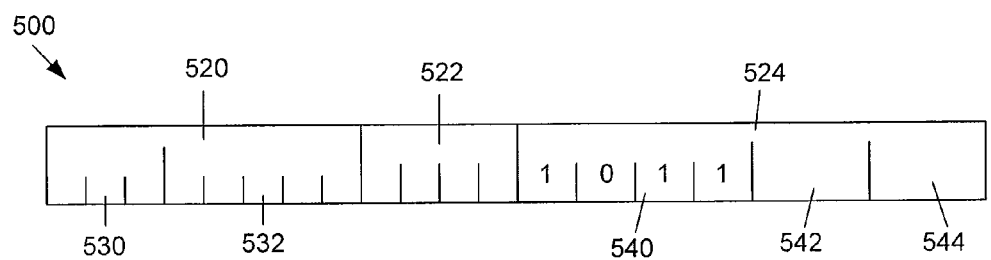
FIG. 5 is a diagram of a third alternative example format of a payload to be included in a packet sent to an apparatus configured to operate in an alarm system.

FIG. 5 shows a diagram of an alternative example format of a payload 500. The example format of the payload 500 is similar to the example format of the payload 400 shown in FIG. 4, except that the payload 500 is configured in a time-length-value (TLV) format. The TLV format of the payload 500 may include a type field 520, a length field 522, and a value field 524. Each of the first data field 402, the second data field 404, the third data field 406, the fourth data field 410, the fifth data field 412, and the sixth data field 414 may be included as fields or sub-fields in the type field 520, the length field 522, and the value field 524 of the TLV format of the payload 500. For example, the first data field 402 identifying a test category of one or more tests that determine a health, status, functionality, or compliancy of a standard or protocol may be included as a first sub-field 530 in the type field 520. Also, the second data field 404 identifying the test associated with the test category identified in the first sub-field 530 may be included as a second sub-field 532 in the type field 520.

Additionally, the value field 524 may include one or more of the third data field 406, fourth data field 410, and the fifth data field 412 of the example payload 400. For example, the third data field 406 may be included as a first sub-field 540 in the value field 524, the fourth data field 410 may be included as a second sub-field 542 in the value field 524, and the fifth data field 412 may be included as a third sub-field 544 in the value field 524. Also, in some example formats of the payload 500, only one or fewer than all the information associated with the first, second, and third sub-fields 540, 542, 544 may be included. For example, the value field 524 of the format of the example payload 500 may include the first sub-field 540 identifying sub-tests to be performed by apparatus 104, but does not include the second sub-field 542 identifying times at which to perform the tests or sub-tests, and does not include the third sub-field 544 identifying information to be included in the reply message. Alternatively, the value field may 524 include the second sub-field 542 and/or information to be included in the second sub-field 542, but not the first sub-field 540 and the third sub-field 544 and/or information to be included in the first sub-field 540 and the third sub-field 544. Alternatively, the value field 524 may include the third sub-field 544 and/or information to be included in the third sub-field 544, but not the first sub-field 540 and the second sub-field 542 and/or information to be included in the first sub-field 540 and the second sub-field 542. In other alternative configurations, the value field 524 may include two of the first, second, and third sub-fields 540, 542, 544 and/or information to be included in two of the first, second, and third sub-fields 540, 542, 544. Various configurations are possible.

In addition, the length field 522 of the example format of the payload 500 may include one or more identifiers or predetermined values that identifies a length or size of the value field 524 and/or identifies one or more lengths or sizes of one or more of the first sub-field 540, the second sub-field 542, and the third sub-field 544 included in the value field 524. The length field 522 and/or the identifiers or predetermined values included in the length field 522 may correspond to the sixth data field 414 and/or identifiers or predetermined values included in the sixth data field 414 shown in FIG. 4.

Figure 6:
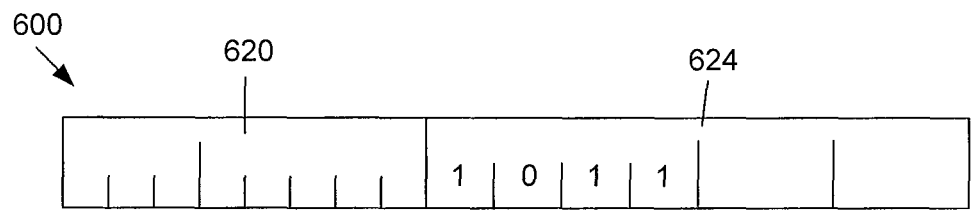
FIG. 6 is a diagram of a fourth alternative example format of a payload to be included in a packet sent to an apparatus configured to operate in an alarm system.
Figure 7:
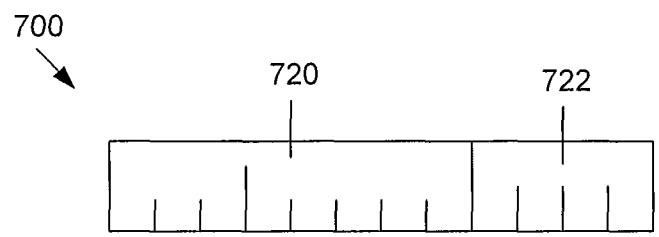
FIG. 7 is a diagram of a fifth alternative example format of a payload to be included in a packet sent to an apparatus configured to operate in an alarm system.

FIGS. 6 and 7 show diagrams of alternative formats of payloads 600, 700, illustrating alternative TLV formats of the payload 500. FIG. 6 shows an example format of a payload 600 having a type-value (TV) format. The example format of the payload 600 may include a type field 620 and a value field 624, and a length field may not be included. FIG. 7 shows a diagram of an example format of a payload 700 having a type-length (TL) format. The example format of the payload 700 may include a type field 720 and a length field 722, and a value field may not be included. The example format of the payload 700 shown in FIG. 7 may be used where the test identified in the second data field does not have any sub-tests, and/or there is single test to be performed, which is identified by the second data field. Alternatively, if no sub-tests are to be performed, the data field identifying which sub-tests are to be performed may include all logic values (e.g., logic "0" value) that indicate that the sub-test is not to be performed.

Figure 8:
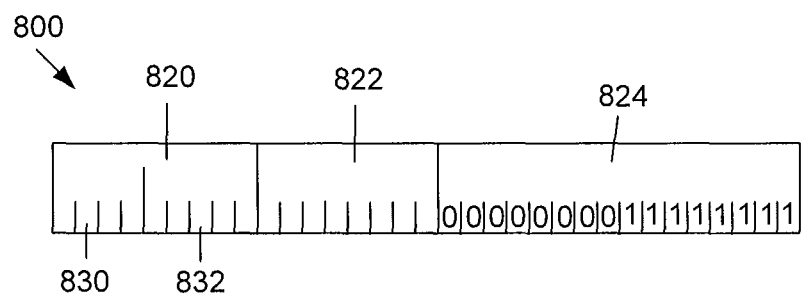
FIG. 8 is a diagram of a sixth alternative example format of a payload to be included in a packet sent to an apparatus configured to operate in an alarm system.

One or more of the formats of the payloads 200-700 shown in FIGS. 2-7 may be configured to include one or more data fields that have a same and/or fixed size or length, regardless and/or independent of the test category and/or the test in the test category identified in the payload. FIG. 8 shows an example TLV format of a payload 800, that includes a type field 820, a length field 822, and a value field 824. Each of the type field 820, the length field 822, and a value field 824 may have a same and/or fixed size or length independent of the test category and/or test identified in the type field 820. To illustrate, as shown in FIG. 8, a first sub-field 830 used to identify the test category may have a length or size of three bits and be configured to contain a three-bit value to identify the test category. Similarly, a second sub-field 832 used to identify the test may have a length or size of five bits and be configured to contain a five-bit value to identify the test. In combination, the type field 820 may include an eight-bit value that identifies a test category-test combination that identifies a test to be performed by the apparatus 104. The value included in the type field 820 may be an eight-bit value regardless of the test category and/or test identified in the payload 800.

Likewise, the length field 822 may have a size or length that is a same or fixed size or length, regardless and/or independent of the test category and/or test identified in the payload 800. In one example, as shown in FIG. 8, the length field 822 may have a size or length of eight bits and/or include eight bit-fields that are configured to contain an eight-bit value to identify the length. The value included in the length field 822 may be an eight-bit value regardless of the test category and/or test identified in the payload 800.

Similarly, the value field 824 and/or a sub-field of the value 824 configured to identify the sub-tests to be performed may have a size or length that is a same or fixed size of length, regardless and/or independent of the test category and/or test identified in the payload 800, and/or independent of the sub-tests available for a particular test. In one example, as shown in FIG. 8, the value field 824 may have a size or length of sixteen bits and/or include sixteen bit-fields that are configured to contain a sixteen-bit value that identifies the sub-tests to be performed by the apparatus 104.

In some example configurations, a number of sub-tests identified in the value field 824 may vary from test to test. If a test has associated a number of sub-tests that is less than the total number of bit-fields in the value field 824, then a remaining number of bit-fields may include logic values (e.g., logic "0") values that indicate to the apparatus 104 not to perform the tests. The remaining number of bit-fields may be located at a predetermined location in the value field 824. In one example, as shown in FIG. 8, the predetermined location may be at a back, end, or last portion of the value field 824. To illustrate, a test identified in the second sub-field 832 of the type field 820 may include eight sub-tests. Because the value field 824 includes a length of sixteen bits, then a remaining portion of eight bits located at the end of the value field 824 may include eight bits of logic values (e.g., logic "0"). The first eight bits of the sixteen-bit value field 824 may include logic values indicating which of the sub-tests are to be performed by the apparatus 104. For example, as shown in FIG. 8, the first eight bits include logic "1" values indicating to the apparatus 104 to perform all eight sub-tests associated with the test identified in the second sub-field 832 of the type field 820.

Subsequently, another payload may be generated having the example format shown in FIG. 8 that includes a different test identified in the second sub-field 832. If, for example, that twelve sub-tests correspond to the different test, then four remaining bit-fields located in at the end of the value field 824 may have logic values indicating to the apparatus 104 not to perform the sub-tests, and the twelve bit-fields preceding the four remaining bit-fields may include logic values indicating which of the twelve sub-tests associated with the test identified in the type field 820 are to be performed by the apparatus 104. In either situation, the length or size of the value identifying the sub-tests to be performed remains the same (e.g., sixteen bits), regardless of the test category and/or test identified in the type field 820.

In other alternative configurations, the size or length of the value field 824 may vary between tests. In one example configuration, the size or length of the value field 824 may vary between two different sizes or lengths, such as eight bits and sixteen bits. In other example configurations, more than two different sizes or lengths may be used.

Although eight-bits were identified as the lengths or sizes for the type field 820 and the length field 822, and sixteen bits was identified as the length or size for the value field 824, any length or size for the different data fields may be used. The length of size may depend on the number of categories, tests, and/or subtests that the apparatus 104 is configured and/or operable to perform and/or that is defined and/or described in a standard or protocol under which the apparatus 104 may be configured to operate. In addition or alternatively, a size or length of the value field may be no less than a maximum number of sub-tests for a test that the apparatus 104 is configured to perform and/or that is defined and/or described in the standard or protocol.

The example formats of payloads 200-800 are exemplary and variations of the formats and/or formats that include combinations of one or more of the formats of the payloads 200-800 shown in FIGS. 2-8 may be used.

Tables 1-9 list various exemplary ways that payloads including instructions that instruct the apparatus 104 to perform tests and/or sub-tests that determine a health, status, functionality, and or compliancy of the ISO 7240 standard may be formatted in accordance with formats shown in FIGS. 5-8. Tables 1-9 list categories, tests, and sub-tests and corresponding values and/or bit locations. The categories, tests, and sub-tests listed in Tables 1-9 may correspond to Parts 16 and 19 of the ISO 7240 standard. The listings of the categories, tests, and sub-tests in Tables 1-9 are exemplary. In other examples, one or more of the categories, tests, and/or sub-tests may be combined or separated. In addition or alternatively, the values, the type of value, and/or bit locations (identified as n bits) associated with the categories, tests, and/or sub-tests may be switched, changed, and/or modified. Also, Tables 1-9 may be modified as the ISO 7240 standard is updated and/or modified and/or as editions following the First edition is released, or as a new standard directed to Fire detection and alarm systems generated from and/or replacing the ISO 7240 standard is created. As such, listings in Tables 1-9 marked Reserved may be replaced and/or added to the tables as categories, tests, and/or sub-tests are redefined, redescribed, replaced, and/or added to the ISO 7240 standard.

Table 1 lists the different test categories as defined and/or described in Parts 16 and 19 of ISO 7240 and their corresponding values. The values are listed in an 8-bit hexadecimal format. The test categories may include a Functional test category, as described and/or defined in ISO 7240-16, Section 17.2; an Operational Environmental test category, as described and/or defined in ISO 7240-16, Section 17.3; an Endurance Environmental test category, as described and/or defined in ISO 7240-16, Section 17.3; and an Inspection test category, as described and/or defined in ISO 7240-19, Section 12.3.3.

TABLE 1

| Test Category | Value |
| --- | --- |
| Functional | 0x0 |
| Operational Environmental | 0x1 |
| Endurance Environmental | 0x2 |
| Inspection | 0x3 |
| Reserved | 0x4-0x7 |

Table 2 lists the different tests that may be associated with the Functional test category as described and/or defined in ISO 7240-16, Section 17.2, and their corresponding values. The values are listed as 16-bit m×n values in hexadecimal format. The tests may include a Voice-alarm Condition test; a Fault-warning Condition test; a Disabled Condition test; a Manual Mode Control test; an Interface to External Control Device(s) test; an Emergency Microphone(s) test; a Redundant Power Amplifiers test; and a Test Condition test.

TABLE 2

| Test Name | Value |
| --- | --- |
| Reserved | 0x0 |
| Voice-alarm Condition | 0x1 |
| Fault-warning Condition | 0x2 |
| Disabled Condition | 0x3 |
| Manual Mode Control | 0x4 |
| Interface to External Control Device(s) | 0x5 |
| Emergency Microphone(s) | 0x6 |
| Redundant Power Amplifiers | 0x7 |
| Test Condition | 0x8 |
| Reserved | 0x9-0x1F |

Tables 3-7 show sub-tests associated with the Fault-warning Condition test, the Disabled Condition test; the Manual Mode Control test; the Interface to External Control Device(s) test; and the Emergency Microphone(s) test, respectively. The Voice-alarm Condition test; the Disabled Condition test; the Redundant Power Amplifiers test; and the Test Condition test may not include sub-tests and/or have test options. As such, no tables listing sub-tests or test options and corresponding bit locations for these tests are shown. Additionally, in some example configurations, the payloads for these tests may not include a value field. As such, the payloads for these tests may have a type field identifying the Functional test category and the test. The payloads for these tests may also include a length field that identifies a length of the value field as being zero. The format of the payload for these tests may be the same and/or similar to the format of the payload 700 shown in FIG. 7.

Table 3 lists the different sub-tests and corresponding values that may be associated with Fault-warning Condition test.

TABLE 3

| Sub-Test | Bit |
| --- | --- |
| Loss of power source | 0 |
| Earth fault | 1 |
| Rupture of a fuse | 2 |
| Short-circuit of a transmission path between parts of the SSCIE | 3 |
| Interruption of a transmission path between parts of the SSCIE | 4 |
| Short-circuit of a transmission path to an emergency microphone | 5 |
| Interruption in a transmission path to an emergency microphone | 6 |
| Short-circuit in a transmission path to a loudspeaker circuit | 7 |
| Interruption in a transmission path to a loudspeaker circuit | 8 |
| Short-circuit in a transmission path to an alarm device circuit | 9 |
| Interruption in a transmission path to an alarm device circuit | 10 |
| Failure of a power amplifier | 11 |
| Short-circuit in a transmission path to an emergency detection system | 12 |
| Interruption in a transmision path to an emergency detection system | 13 |
| Reserved | 14 |
| Reserved | 15 |

Table 4 lists the different sub-tests and corresponding values that may be associated with the Manual Mode Control test.

TABLE 4

| Sub-Test | Bit |
| --- | --- |
| Check general requirement | 0 |
| Activate voice-alarm and check indication | 1 |

TABLE 4-continued

| Sub-Test | Bit |
| --- | --- |
| Deactivate voice-alarm, generate fault-warning, check indication | 2 |
| Reset fault-warning, generate a disablement condition, check indication | 3 |
| Reserved | 4 |
| Reserved | 5 |
| Reserved | 6 |
| Reserved | 7 |

Table 5 lists the different sub-tests and corresponding values that may be associated with the Interface to External Control Device(s) test.

TABLE 5

| Sub-Test | Bit |
| --- | --- |
| Check access level requirements | 0 |
| External control devices do not override the mandatory functions of the SSCIE | 1 |
| Verify that fault-warning condition requirements are met | 2 |
| Reserved | 3 |
| Reserved | 4 |
| Reserved | 5 |
| Reserved | 6 |
| Reserved | 7 |

Table 6 lists the different sub-tests and corresponding values that may be associated with the Emergency Microphone(s) test.

TABLE 6

| Sub-Test | Bit |
| --- | --- |
| Check Priority Levels | 0 |
| Check operation of the emergency microphone control | 1 |
| Audible indications are automatically muted when in use | 2 |
| Operation goes back to previous state after use | 3 |
| When operated, signals are broadcast to a pre-configured set of emergency loudspeaker zones | 4 |
| Microphone priority requirements are met | 5 |
| Reserved | 6 |
| Reserved | 7 |

Table 7 lists the different tests that may be associated with the Operational Environmental test category and corresponding values, listed as hexadecimal values.

TABLE 7

| Test Name | Value |
| --- | --- |
| Reserved | 0x0 |
| Output Power | 0x1 |
| Signal-to-Noise Ratio | 0x2 |
| Frequency response without microphone(s) | 0x3 |
| Frequency response with microphone(s) | 0x4 |
| Cold | 0x5 |
| Damp Heat (Operational) | 0x6 |
| Impact | 0x7 |
| Vibration (Operational) | 0x8 |
| Supply voltage variation | 0x9 |

TABLE 7-continued

| Test Name | Value |
| --- | --- |
| Electromagnetic compatibility (EMC) immunity test | 0xA |
| Reserved | 0xB-0x1F |

The tests associated with the Operational Environmental test category listed in Table 7 may not include sub-tests and/or have test options. As such, no tables listing sub-tests or test options and corresponding bit locations for these tests are shown. Additionally, in some example configurations, the payloads for these tests may not include a value field. As such, the payloads for these tests may have a type field identifying the Operational Environmental test category and the test. The payloads for these tests may also include a length field that identifies a length of the value field as being zero. The format of the payload for these tests may be the same and/or similar to the format of the payload 700 shown in FIG. 7. In alternative implementations where one or more of the tests includes sub-tests and/or test options, the payload for these tests may be modified and/or updated to include a value field identifying the sub-tests and/or test options to be performed. Additionally, the length field may be modified and/or updated to identify the length of the added value field.

Table 8 lists the different tests that may be associated with the Endurance Environmental test category and corresponding values, listed as hexadecimal values.

TABLE 8

| Test Name | Value |
| --- | --- |
| Reserved | 0x0 |
| Damp Heat | 0x1 |
| Vibration | 0x2 |
| Reserved | 0x3-0x1F |

The tests associated with the Endurance Environmental test category listed in Table 8 may not include sub-tests and/or have test options. As such, no tables listing sub-tests or test options and corresponding bit locations for these tests are shown. Additionally, in some example configurations, the payloads for these tests may not include a value field. As such, the payloads for these tests may have a type field identifying the Endurance Environmental test category and the test. The payloads for these tests may also include a length field that identifies a length of the value field as being zero. The format of the payload for these tests may be the same and/or similar to the format of the payload 700 shown in FIG. 7. In alternative implementations where one or more of the tests includes sub-tests and/or test options, the payload for these tests may be modified and/or updated to include a value field identifying the sub-tests and/or test options to be performed. Additionally, the length field may be modified and/or updated to identify the length of the added value field.

Table 9 lists the different tests that may be associated with the Endurance Environmental test category and corresponding values, listed as hexadecimal values.

TABLE 9

| Test Name | Value |
| --- | --- |
| Reserved | 0x0 |
| Time required to broadcast in the voice alarm condition | 0x1 |

TABLE 9-continued

| Test Name | Value |
| --- | --- |
| All non-emergency functions are disabled during emergency operation | 0x2 |
| The SSEP is able to broadcast warning and speech signals in one or more areas simultaneously | 0x3 |
| Speech intelligibility requirements are satisfied | 0x4 |
| Measure and record the ambient noise level at the emergency microphone | 0x5 |
| Standby power source capacity is equal to or greater than the calculated requirements | 0x6 |
| Failure of the communication link between the emergency detection system and the SSEP is reported as a fault | 0x7 |
| Reserved | 0x8-0x1F |

The tests associated with the Inspection test category listed in Table 9 may not include sub-tests and/or have test options. As such, no tables listing sub-tests or test options and corresponding bit locations for these tests are shown. Additionally, in some example configurations, the payloads for these tests may not include a value field. As such, the payloads for these tests may have a type field identifying the Inspection test category and the test. The payloads for these tests may also include a length field that identifies a length of the value field as being zero. The format of the payload for these tests may be the same and/or similar to the format of the payload 700 shown in FIG. 7. In alternative implementations where one or more of the tests includes sub-tests and/or test options, the payload for these tests may be modified and/or updated to include a value field identifying the sub-tests and/or test options to be performed. Additionally, the length field may be modified and/or updated to identify the length of the added value field.

Referring back to FIG. 1, the information to be sent from the central control system 102 to the apparatus 104 may be generated as a payload of a packet, which may be formatted in accordance with the formats of the example payloads 200-800 shown in FIGS. 2-9, and/or in accordance with the ISO 7240 standard as listed in Tables 1-9. The payloads may be generated using the processor 120 and/or the application stored in the memory 122 which may be executed by the processor 120. After the payload is generated, the payload may be packetized and/or included as a request packet. In some example configurations, the generated payload may be packetized with other payloads generated by the central control system 102 that are to be transmitted to the apparatus 104 over the network 110. That is, the request packet may include multiple payloads formatted in accordance with the example formats of the payloads 200-800 previously described. The request packet may be generated in any packet format and/or in accordance with any standard or protocol, as previously described. The request packet including the payload may be sent to a network interface 124 of the central control system 102 for transmission over the network 110. Before being transmitted, the request packet may be buffered for a predetermined period of time. After the predetermined period of time, the request packet may be sent over the network 110 via the network interface 124 and to the apparatus 104.

The apparatus 104 may be configured to receive the request packet sent by the central control system 102 from over the network 110. The apparatus 104 may include a network interface 134 that is configured to communicate with the network 110, and the apparatus 104 may be configured to receive the request packet using the network interface 134. The apparatus 104 may also include one or more processors 130 and a memory 132. The apparatus 104 may include one or more applications, such as high level applications, stored in the memory 132 and executable by the processor 130. The processor 130 and/or an application when executed by the processor 130, may be configured to unravel and/or depacketize the request packet. By unraveling and/or depacketizing the packet, the processor 130 and/or the application may be configured to identify the payload contained in the request packet and/or identify the request packet as being a packet that includes instructions for the apparatus 104 to perform one or more tests that determine the health, status, functionality and/or compliancy of a standard or protocol. Upon identifying the payload, the processor 130 and/or the application may be configured to process the payload and/or send the payload to another application that may be configured to process the payload. The processor 130 and/or the application configured to process the payload may be configured to perform one or more of the tests identified in the instructions in the payload. The tests may be performed at one or more times specified in the instructions.

After and/or while performing the tests, the processor 130 and/or the application may be configured to determine and/or assemble results of the tests. In some example configurations, the results may be determined and/or assembled in accordance with the instructions included in the request packet. After all or at least some of the results are determined and/or assembled, the processor 130 and/or the application may generate a payload to be included in a reply packet for transmission to the central control system 102. The payload may include results from all of the tests identified in the request packet, results from less than all of the tests identified in the request packet, results from multiple results identified in multiple payloads, results from multiple tests identified in multiple request packets received by the apparatus, or combinations thereof.

Figure 9:
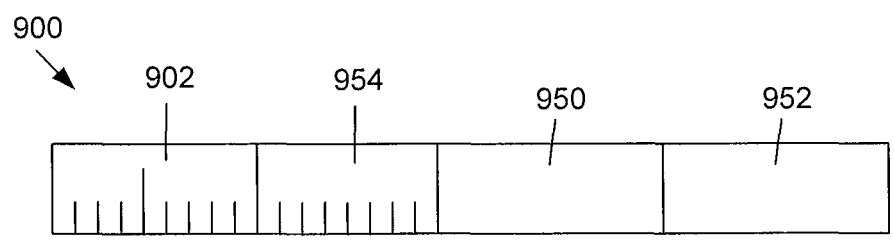
FIG. 9 is a diagram of an example format of a payload to be included in a packet sent to a central control system configured to determine compliancy of an apparatus configured to operate in an alarm system.

FIG. 9 shows a diagram of an example format of a payload 900 to be included in a reply packet. The example format of the payload 900 may include at least one data field that includes the same information as a data field included in the request packet. For example, the example format of the payload 900 may include a first data field 902 that includes one or more identifiers or predetermined values that identifies a category of the tests and/or sub-tests performed by the apparatus 104, a test associated with the category, and/or the payload as including instructions that instruct the apparatus to perform one or more tests that determine a health, status, functionality, and/or compliancy with a standard or protocol. The first data field 902 may include identifiers and/or predetermined values corresponding to and/or that are the same as the identifiers and/or predetermined values included in the first data field 202 shown in FIG. 2; the first data fields 302, 402 and second data fields 304, 404 shown in FIGS. 3 and 4; and/or the type fields 520, 620, 720, 820 shown in FIGS. 5, 6, 7, and 8, as examples.

The payload included in the reply packet may also include a second data field 950 that includes pass/fail test result information. The pass/fail test result information may include one or more identifiers or predetermined values that identify "yes or no" or other similar type information corresponding to one or more of the tests and/or sub-tests, and/or the pass/fail test result information. The pass/fail test result information may include: "Test Failed," "Test Passed," "Test Partially Passed," "Test Not Run," and/or "Test Inconclusive or Incomplete." Other pass/fail test result information may be included. The pass/fail test result information may have corresponding identifiers and/or predetermined values. The identifiers and/or predetermined values may be of any type, such as binary, hexadecimal, decimal, or ASCII as examples.

The reply packet payload may also include a third data field 952 that includes additional information relating to the rest of the results that may not be included in the second data field 950. The information included in the third data field 952 may include details related to one or more of the identifiers and/or predetermined values included in the second data field 950. For example, if one or more identifiers included in the second data field 950 identifies one or results as being that the test failed, the test partially passed, the test was not run, and/or the test was inconclusive or incomplete, then the third data field 952 may include information that describes and/or details why the test failed, partially passed, was not run, or was inconclusive. Other detailed information related to the test may also be included, such as one or more times that the test was performed and/or that the results were generated, or an identification of the apparatus 104 performing the tests, as examples. The information included in the third data field 952 may be in any type or format or file format, such as a text file, extensible markup language (XML), or static data fields, as examples.

The reply packet payload may also include a fourth data field 954 that includes one or more identifiers and/or predetermined values that identifies one or more lengths or sizes of the second data field 950 and/or the third data field 952. In one example configuration, the fourth data field 954 may identify a total size or length of the second data field 950 and/or the third data field 952 that are included in the payload 900. For example, if both the second data field 950 and the third data field 952 are included in the payload, then the total size or length may be a combined size or length of the size or length of the second data field 950 and the length or size of the third data field 950. Alternatively, if only one of the second data field 950 and the third data field 952 is included in the payload 900, then the total size or length may be the size or length of only the second data field 950 or the third data field 950 that is included. In alternative configurations, where both the second data field 950 and the third data field 952 are included in the payload 900, the fourth data field 954 may include multiple identifiers or predetermined values that identify both the length or size of the second data field 950 and the length or size of the third data field 952. Various configurations are possible.

Figure 10:
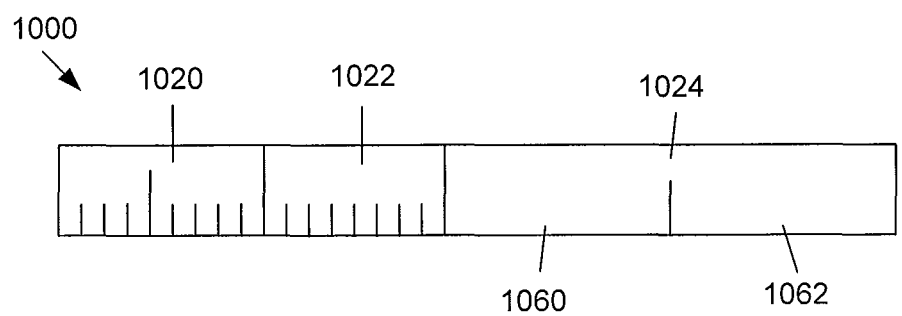
FIG. 10 is a diagram of an alternative example format of a payload to be included in a packet sent to a central control system configured to determine compliancy of an apparatus configured to operate in an alarm system.

FIG. 10 shows a diagram of an example format of a payload 1000 that may be included in the reply packet sent by the apparatus 104. The example format of the payload 1000 may be a TLV format that includes a type field 1020, a length field 1022, and a value field 1024. In one example configuration, the type field 1020 may correspond to and/or include the same or similar identifiers and/or predetermined values as the first data field 902 of the payload 900 shown in FIG. 9. Also, the length field 1022 may correspond to and/or include the same or similar identifiers and/or predetermined values as the fourth data field 954 of the payload 900. In addition, the value field 1024 may correspond to and/or include the same or similar information, identifiers, and/or predetermined values as the second data field 950 and/or the third data field 952 of the payload 900. If both the second data field 950 and the third data field 952 are included in the payload 1000, the value field 1024 may include a first sub-field 1060 that includes the second data field 950 and a second sub-field 1062 that includes the third data field 952. Other example formats of the payload 1000 may not include the length field 1022, and/or the value field 1024 may include one but not both of the first sub-field 1060 and the second sub-field 1062. Various configurations are possible.

Referring back to FIG. 1, after the payload for the reply packet is generated, an application stored in the memory 132 of the apparatus 104 may be configured to packetize the payload. In some example configurations, the payload may be packetized with other payloads generated by the apparatus 104 and/or generated by other apparatuses 104 that may be part of the alarm system. That is, the reply packet may include multiple payloads formatted in accordance with the example formats of the payloads 900, 1000 previously described. The reply packet may be generated in any packet format and/or in accordance with any standard or protocol, as previously described. The packet format of the reply packet and/or the standard or protocol under which the reply packet is formatted may be same as the packet format of the request packet and/or the standard or protocol under which the request packet was formatted. The reply packet including the payload may be sent to the network interface 134 of the apparatus 104 for transmission over the network 110. Before being transmitted, the reply packet may be buffered for a predetermined period of time. After the predetermined period of time, the reply packet may be sent over the network 110 via the network interface 134 and to the central control system 104.

The central control system 102 may be configured to receive the reply packet sent by the apparatus 104 from over the network 110. The central control system 102 may be configured to receive the reply packet using the network interface 124. The processor 120 and an application stored in the memory 122 may be configured to unravel and/or depacketize the reply packet. Upon unraveling and/or depacketizing the reply packet, the processor 120 and/or the application may be configured to identify the reply packet as having a payload that includes test results from tests identified in the request packet sent by the central control system 102. The processor 120 and/or the application may be configured to process the payload and/or send the payload to another application for processing. The processor 120 and/or the application may analyze the results included in the payload. In response to analyzing the results, the processor 120 and/or the application may generate and/or output one or more messages or output signals to a display unit, such as the display unit 1210 of the computer system 1200 shown in FIG. 12, indicative of the test results and/or the health, status, functionality, and/or compliancy of a standard or protocol of the apparatus 104. Based on the messages and/or signals that are output, decisions as to further action may be made. For example, if the output indicates that the apparatus 104 is functioning properly and/or is compliant with the standard or protocol, then no further action may be taken. Alternatively, the output indicates that the apparatus 104 is not functioning properly and/or is non-compliant with the standard or protocol, then maintenance or replacement of the apparatus 104 may be taken. Instructions and/or suggestions as to further actions may be included in the output.

In some example configurations, the central control system 102 may be equipped with enumeration capabilities. Before generating the payload and/or sending the packet including the payload, the central control system 102 may be configured to transmit one or more probe signals to determine and/or identify the apparatuses 104 that are part of the alarm system, compliant with a standard or protocol of the alarm system, and/or communicating over the network 110. The central control system 102 may be configured to send the signals before or after connecting to the network 110. In response to sending out the probe signals, the central control system 102 may be configured to receive response signals that identify the apparatuses 104 and/or identify the roles, functions, and/or services that the apparatuses 104 are configured to perform in the alarm system. Based on receiving the response signals, the central control system 102 may be configured to determine at least some of the information to be included in one or more payloads.

In addition or alternatively, the central control system 102 may be configured to output and/or display information contained in and/or related to the response messages using a display unit, such as the display unit 1210 of the computer system 1200 shown in FIG. 12. Based on the outputted and/or displayed information, the central control system 102 may be configured to receive one or more input signals via an input device, such as the input device 1212 of the computer system 1200 shown in FIG. 12, that identifies and/or determines at least some of the information to be included in one or more of the payloads.

In addition, the central control system 102 may also be equipped with timeout capabilities. The central control system 102 may be configured to establish one or more timeout periods for the packets that are transmitted. The timeout periods may be predetermined time periods that specify how long the central control system 102 is to wait for a corresponding reply packet before taking a subsequent predetermined action. If the timeout period elapses or expires without the central control system 102 receiving the corresponding request packet, then the central control system 102 may be configured to perform one or more actions, such as generate and/or send another packet over the network 110, or output one or more signals or message, such as via a display unit, indicating that a reply packet was not received, as examples.

Figure 11:
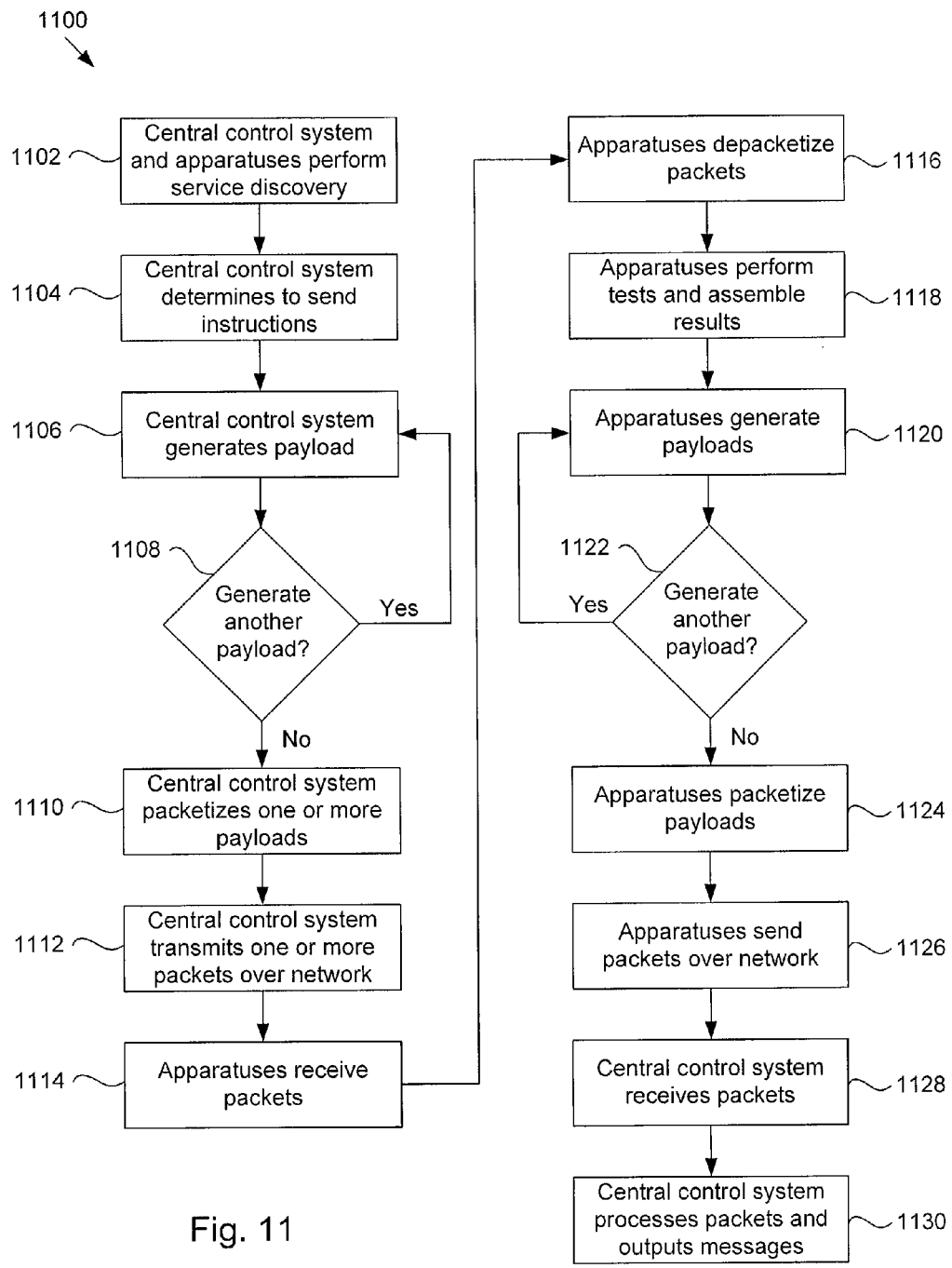
FIG. 11 is a flow diagram of an example method of communicating a request and reply packets between a central control system and one or more apparatuses configured to operate in an alarm system.

FIG. 11 shows a flow chart of an example method 1100 of communicating request packets and reply packets over a network between a central control system and one or more apparatuses configured to operate in an alarm system. At block 1102, the central control system and the apparatuses may exchange messages for service discovery so that a central control system may identify the apparatuses in the alarm system and/or the services that they perform. In one example configuration, the central control system may send one or more probe signals to identify one or more apparatuses in the alarm system and/or services that the apparatuses perform. The apparatuses in the alarm system may respond by sending probe response signals to the central control system. In response to receiving the probe response signals, the central control system may identify the apparatuses in the alarm system, the tests in the alarm system that the apparatuses are configured to perform, and/or the services that they perform. In one configuration, the central control system may be connected to the network prior to sending the probe signals. Alternatively, the central control system may connect to the network after service discovery completes the identification of apparatuses and/or their services.

At block 1104, the central control system may determine to send instructions to the apparatuses to perform one or more tests to determine a health, status, functionality, and/or compliancy in a standard or protocol. In one example, the standard or protocol may be the ISO 7240 standard. The tests for the apparatuses to perform may be defined and/or described in the standard or protocol. The central control system may determine the contents of the instructions. For example, the central control system may select one or more tests of a plurality of tests that may described and/or defined in the standard or protocol, and/or that the apparatuses in the alarm system may be configured to perform. The central control system may select the tests based on various criteria. For example, the central control system may select one or more of the tests based on the probe responses received during the discovery exchange. In addition or alternatively, the central control system may select one or more of the tests based on one or more inputs received from an input device, such as the input device 1212 of the computer system 1200 shown in FIG. 12.

At block 1106, the central control system may generate a payload to be included in a request packet that includes the instructions. The payload may be formatted in any of a variety of formats, such as the formats of the payloads 200-800 shown in FIGS. 2-8. Also, the payload may include identifiers, predetermined values, or any other types of information in data fields in accordance with the example formats of the payloads 200-800. The central control system may organize the instructions into categories, tests, and/or sub-tests, depending on the format used for the payload.

After the payload is generated, at block 1108, the central control system may determine whether to generate another payload to be included in the request. The central control system may make the determination based on whether the instructions include another category and/or another test. To illustrate, if the instructions include a first test that is associated with a first category and a second test that is associated with a second category, then the central control system may determine to generate two payloads, a first payload the includes identifiers and/or predetermined. As another illustration, if the instructions include two tests, both associated with the same category, then the central control system may determine to generate two payloads, one payload that identifies the category and the first test, and another payload that identifies the category and the second test. Various other criteria may be used to determine whether to generate another payload.

If the central processing system determines to generate another payload, then the method proceeds back to block 1106, where the central processing system generates another payload. Alternatively, if the central processing system determines not to generate another payload, then at block 1110, the central processing system packetizes the generated payloads to generate one or more request packets. The payloads may be packetized in any format and/or under any standard or protocol, as previously described. Where multiple payloads were generated, the central processing unit may determine to include the multiple payloads in a single request packet, in multiple request packets, or combinations thereof.

At block 1112, one or more of the request packets may be transmitted over the network. The request packets may be transmitted to a single apparatus or broadcast or multicast to a plurality of apparatuses over the network. The packets may be transmitted simultaneously or almost simultaneously to the plurality of apparatuses over the network.

At block 1114, one or more of the apparatuses may receive the packets from over the network. At block 1116, each of the apparatuses receiving a request packet may depacketize the request packet. Also, at block 1116, after depacketizing the request packet, each of the apparatuses may identify one or more payloads included in the request packet. Each of the apparatuses may identify the payloads as including instructions that instruct the apparatus to perform one or more tests to determine the health, status, functionality, and/or compliancy of a standard or protocol.

At block 1118, each of the apparatuses may process one or more of the payloads and perform the tests and/or sub-tests identified in the payloads. Each of the apparatuses may determine and/or assemble test results in response to performing the tests or sub-tests. At block 1120, after the results are assembled, each of the apparatuses may generate a payload that includes and/or identifies the test results. The payload may be formatted in any type of format, such as the example formats of the payloads 900, 1000 shown in FIGS. 9 and 10. At block 1122, the apparatuses may determine to generate another payload. In one example configuration, the number of payloads that each of the apparatuses determines to generate may correspond to the number of payloads received in the request packet. Alternatively, the apparatuses may determine to generate a single payload that includes test results from a plurality of tests identified in multiple request packets. If an apparatus determines to generate another payload, then the method may proceed to block 1120, where another payload is generated. Alternatively, if an apparatus determines not to generate another payload, then at block 1124, one or more of the payloads are packetized into one or more reply packets. Where multiple payloads are generated, the apparatus may include the multiple payloads in a single reply packet, or alternatively may generate multiple reply packets to include the multiple payloads. Various configurations are possible.

At block 1126, each of the apparatuses may send the reply packets over the network to the central control system. At block 1128, the central control system receives the reply packets from the apparatuses. At block 1130, the central control system may process each of the reply packets to determine the test results for each of the apparatuses. Also, at block 1130, the central control system may output one or more messages indicating the test results.

One or more of the central control system 102 and/or the apparatus 104 shown in FIG. 1 may be and/or may include a portion or all of one or more computing devices of various kinds, such as the computing device in FIG. 12. FIG. 12 illustrates an example of a general computer system designated 1200. Any of the components from the system 100 shown in FIG. 1 may include a portion or all of the computer system 1200. For example, in some examples, the computer system 1200 may include only a processor and memory. The computer system 1200 can include a set of instructions that can be executed to cause the computer system 1200 to perform any one or more of the methods or computer based functions disclosed. The computer system 1200 may operate as a standalone device or may be connected, e.g., using a network, to other computer systems or peripheral devices.

In a networked deployment, the computer system 1200 may operate in the capacity of a server or as a client user computer in a server-client user network environment, or as a peer computer system in a peer-to-peer (or distributed) network environment. The computer system 1200 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular example, the computer system 1200 can be implemented using electronic devices that provide voice, audio, video or data communication. Further, while a single computer system 1200 is illustrated, the term "system" shall also be taken to include any collection of systems or sub-systems that individually or jointly execute a set, or multiple sets, of instructions to perform one or more computer functions.

In FIG. 12, the example computer system 1200 may include a processor 1202, e.g., a central processing unit (CPU), a graphics processing unit (GPU), or both. The processor 1202 may be a component in a variety of systems. For example, the processor 1202 may be part of a standard personal computer or a workstation. The processor 1202 may be one or more general processors, digital signal processors, application specific integrated circuits, field programmable gate arrays, servers, networks, digital circuits, analog circuits, combinations thereof, or other now known or later developed devices for analyzing and processing data. The processor 1202 may implement a software program, such as code generated manually (i.e., programmed).

The term "module" may be defined to include a plurality of executable modules. As described herein, the modules are defined to include software, hardware or some combination thereof executable by a processor, such as processor 1202. Software modules may include instructions stored in memory, such as memory 1204, or another memory device, that are executable by the processor 1202 or other processor. Hardware modules may include various devices, components, circuits, gates, circuit boards, and the like that are executable, directed, and/or controlled for performance by the processor 1202.

The computer system 1200 may include a memory 1204, such as a memory 1204 that can communicate via a bus 1208. The memory 1204 may be a main memory, a static memory, or a dynamic memory. The memory 1204 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, the memory 1204 includes a cache or random access memory for the processor 1202. In alternative examples, the memory 1204 is separate from the processor 1202, such as a cache memory of a processor, the system memory, or other memory. The memory 1204 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 1204 is operable to store instructions executable by the processor 1202. The functions, acts or tasks illustrated in the figures or described may be performed by the programmed processor 1202 executing the instructions stored in the memory 1204. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 1200 may or may not further include a display unit 1210, such as a liquid crystal display (LCD), an organic light emitting diode (OLED), a flat panel display, a solid state display, a cathode ray tube (CRT), a projector, a printer or other now known or later developed display device for outputting determined information. The display 1210 may act as an interface for the user to see the functioning of the processor 1202, or specifically as an interface with the software stored in the memory 1204 or in the drive unit 1216.

Additionally, the computer system 1200 may include an input device 1212 configured to allow a user to interact with any of the components of system 1200. The input device 1212 may be a number pad, a keyboard, or a cursor control device, such as a mouse, or a joystick, touch screen display, remote control or any other device operative to interact with the computer system 1200.

In a particular example, as depicted in FIG. 12, the computer system 1200 may also include a disk or optical drive unit 1216. The disk drive unit 1216 may include a computer-readable medium 1222 in which one or more sets of instructions 1224, e.g. software, can be embedded. Further, the instructions 1224 may embody one or more of the methods or logic as described. In a particular example, the instructions 1224 may reside completely, or at least partially, within the memory 1204 and/or within the processor 1202 during execution by the computer system 1200. The memory 1204 and the processor 1202 also may include computer-readable media as discussed above.

The present disclosure contemplates a computer-readable medium that includes instructions 1224 or receives and executes instructions 1224 responsive to a propagated signal so that a device connected to a network 1226 can communicate voice, video, audio, images or any other data over the network 1226. Further, the instructions 1224 may be transmitted or received over the network 1226 via a communication port or interface 1220, and/or using a bus 1208. The communication port or interface 1220 may be a part of the processor 1202 or may be a separate component. The communication port 1220 may be created in software or may be a physical connection in hardware. The communication port 1220 may be configured to connect with a network 1226, external media, the display 1210, or any other components in system 1200, or combinations thereof. The connection with the network 1226 may be a physical connection, such as a wired Ethernet connection or may be established wirelessly as discussed later. Likewise, the additional connections with other components of the system 1200 may be physical connections or may be established wirelessly. The network 1226 may alternatively be directly connected to the bus 1208.

The network 1226 may include wired networks, wireless networks, Ethernet AVB networks, or combinations thereof. The wireless network may be a cellular telephone network, an 802.11, 802.16, 802.20, 802.1Q or WiMax network. Further, the network 1226 may be a public network, such as the Internet, a private network, such as an intranet, or combinations thereof, and may utilize a variety of networking protocols now available or later developed including, but not limited to TCP/IP based networking protocols.

While the computer-readable medium is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding or carrying a set of instructions for execution by a processor or that cause a computer system to perform any one or more of the methods or operations disclosed. The "computer-readable medium" may be non-transitory, and may be tangible.

In an example, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative example, dedicated hardware implementations, such as application specific integrated circuits, programmable logic arrays and other hardware devices, can be constructed to implement various modules or parts of modules included in the system. Applications that may include the apparatus and systems can broadly include a variety of electronic and computer systems. One or more examples described may implement functions using two or more specific interconnected hardware modules or devices with related control and data signals that can be communicated between and through the modules, or as portions of an application-specific integrated circuit. Accordingly, the present system encompasses software, firmware, and hardware implementations.

The system described may be implemented by software programs executable by a computer system. Further, in a non-limited example, implementations can include distributed processing, component/object distributed processing, and parallel processing. Alternatively, virtual computer system processing, such as cloud computing, can be constructed to implement various parts of the system.

The system is not limited to operation with any particular standards and protocols. For example, standards for Internet and other packet switched network transmission (e.g., TCP/IP, UDP/IP, HTML, HTTP) may be used. Such standards are periodically superseded by faster or more efficient equivalents having essentially the same functions. Accordingly, replacement standards and protocols having the same or similar functions as those disclosed are considered equivalents thereof.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A method of transmitting packets over a network to an apparatus configured in an alarm system, the method comprising:
    determining, with at least one processor, a test to be performed by the apparatus that determines a status of the apparatus in the alarm system;
    generating, with the at least one processor, a payload that includes information that identifies the test and a category associated with the test;
    generating, with the at least one processor, a packet that includes the payload;
    transmitting, with the at least one processor, the packet over the network to the apparatus.

2. The method of claim 1, where the test further determines a compliancy with a standard or protocol of the apparatus in the alarm system.

3. The method of claim 2, where the standard or protocol comprises an International Organization for Standardization (ISO) 7240 standard.

4. The method of claim 1, where the information that identifies the test comprises first information and the information that identifies the category comprises second information, the method further comprising:

determining, with the at least one processor, the category associated with the test, the category being described in a standard or protocol, where generating the payload comprises:
  generating, with the at least one processor, a first data field that includes the first information that identifies the test; and
  generating with the at least one processor, a second data field that includes the second information identifying the category.

5. The method of claim 4, further comprising:
determining, with the at least one processor, a plurality of sub-tests associated with the test, the plurality of sub-tests being described in the standard or protocol, where generating the payload further comprises:
  generating, with the at least one processor, a third data field that includes third information that identifies the plurality of sub-tests.

6. The method of claim 5, where the third information comprises a plurality of identifiers, each identifier identifying a sub-test of the plurality of sub-tests and identifying whether or not the apparatus is to perform the sub-test, each identifier being located in a predetermined location of the third data field that corresponds to the sub-test.

7. The method of claim 1, where the information that identifies the test comprises first information, the method further comprising:
determining, with the at least one processor, a time at which the apparatus performs the test, where generating the payload comprises:
  generating, with the at least one processor, a first data field that includes the first information that identifies the test; and
  generating, with the at least one processor, a second data field that includes second information, the second information identifying the time.

8. The method of claim 1, where transmitting the packet comprises: transmitting the packet from a location that is remote from a building or structure in which the alarm system is installed.

9. The method of claim 1, further comprising:
receiving, with the at least one processor, a reply packet from over the network; and
determining, with the at least one processor, a test result associated with the test.

10. The method of claim 1, further comprising:
transmitting, with the at least one processor, a probe message to identify the apparatus in the alarm system and one or more tests in the alarm system that the apparatus is configured to perform.

11. The method of claim 1, where the apparatus comprises a first apparatus, and the method further comprising:
transmitting, with the at least one processor, the packet to a second apparatus configured in the alarm system simultaneously with transmitting the packet to the first apparatus.

12. A method of receiving packets over a network by an apparatus configured to operate in an alarm system, the method comprising:
receiving, with at least one processor, a request packet from over the network, the request packet including first information that identifies a test to be performed by the apparatus that determines a status of the apparatus in the alarm system and one or more of a category and a plurality of sub-tests associated with the test;
identifying, with the at least one processor, the test identified in the request packet;
performing, with the at least one processor, the test;
determining, with the at least one processor, a test result in response to performing the test;
generating, with the at least one processor, a payload that includes second information identifying the test result;
generating, with the at least one processor, a reply packet that includes the payload;
transmitting, with the at least one processor, the reply packet over the network.

13. The method of claim 12, where the test further determines a compliancy with a standard or protocol of the apparatus in the alarm system.

14. The method of claim 13, where the standard or protocol comprises an International Organization for Standardization (ISO) 7240 standard.

15. The method of claim 12, where generating the payload comprises:
generating, with the at least one processor, a first data field that includes the second information identifying the test result; and
generating, with the at least one processor, a second data field that includes third information that identifies the test performed by the apparatus.

16. The method of claim 15, where the third information is the same as the first information.

17. The method of claim 12, where the information identifying the test result comprises an identifier that identifies the test as one of: having passed, having failed, having partially passed, not being performed, and being incomplete.

18. The method of claim 12, where generating the payload comprises:
generating, with the at least one processor, a first data field that includes the second information identifying the test result; and
generating with the at least one processor, a second data field that includes information other than the second information that describes the test result.

19. A network communication system comprising:
a central control system configured to communicate over a network, the central control system comprising:
  a memory configured to store a plurality of tests that determine a status of one or more apparatuses configured to operate in an alarm system; and
  a processor in communication with the memory, the processor configured to:
    identify an apparatus of the one or more apparatuses that is connected to the network;
    select a test of the plurality of tests to be performed by the apparatus;
    generate a payload that includes information that identifies the test and information that identifies a plurality of sub-tests associated with the test;
    generate a request packet that includes the payload; and
    transmit the request packet over the network to the apparatus.

20. The network communication system of claim 19, where the plurality of tests further determine a compliancy with a standard or protocol of the apparatus in the alarm system.

21. The network communication system of claim 20, where the standard or protocol comprises an International Organization for Standardization (ISO) 7240 standard.

22. The network communication system of claim 19, where the information that identifies the test comprises first information, and where the processor is further configured to:
determine a category associated with the test, the category being described in a standard or protocol;

generate a first data field of the payload, the first data field including the first information that identifies the test;

generate a second data field of the payload, the second data field including second information that identifies the category.

23. The network communication system of claim 22, where the processor is further configured to:

determine the plurality of sub-tests associated with the test, the plurality of sub-tests being described in the standard or protocol; and generate a third data field of the payload, the third data field including third information that identifies the plurality of sub-tests.

24. The network communication system of claim 19, where the processor is further configured to:

transmit one or more probe messages to identify the one or more apparatuses in the alarm system and one or more tests in the alarm system that the one or more apparatuses are configured to perform.

25. The network communication system of claim 19, where the processor is configured to simultaneously transmit the request packet to at least two of the one or more apparatuses.

26. The network communication system of claim 19, the information identifying the test comprising first information, the payload comprising a first payload, the processor of the central control system comprising a first processor, the network communication system further comprising:

the apparatus connected to the network, the apparatus being configured to operate in the alarm system, the apparatus comprising a second processor configured to:
receive the request packet;
identify the test identified in the request packet;
perform the test;
determine a test result in response to performance of the test;
generate a second payload that includes second information that identifies the test result;
generate a reply packet that includes the second payload; and
transmit the reply packet over the network.

27. The network communication system of claim 25, where the apparatus is configured to operate in the alarm system in accordance with an International Organization Standardization (ISO) 7240 standard.

28. The network communication system of claim 25, where the second processor is further configured to:

generate a first data field of the second payload that includes the second information identifying the test result; and generate a second data field of the second payload that includes third information that identifies the test performed by the apparatus, where the third information is the same as the first information included in the request packet.

29. The network communication system of claim 19, where the network communication system is positioned in a location that is remote from the apparatus, where the network comprises a wireless network; and where the processor is configured to transmit the request packet to the apparatus over the wireless network.

30. One or more non-transitory computer readable storage media encoded with software comprising computer executable instructions and when the software is executed operable to:

identify a test to be performed by an apparatus configured to operate in an alarm system, the test being used to determine a compliancy with a standard or protocol of the apparatus in the alarm system;

generate a request packet that includes information identifying the test and a category associated with the test, the category being described in a standard or protocol; and transmit the request packet over a network to the apparatus.

31. The non-transitory one or more computer readable storage media of claim 29, where the standard or protocol comprises an International Organization for Standardization (ISO) 7240 standard.

32. The one or more non-transitory computer readable storage media of claim 29, where the software when executed is further operable to:

generate a payload that includes the information identifying the test, the payload being generated in a type-length-value (TLV) format.

33. The non-transitory one or more computer readable storage media of claim 29, where the information identifying the test comprises first information, and where the software when executed is further operable to: receive the request packet; identify the test identified in the request packet; perform the test; determine a test result in response to performance of the test;

generate a reply packet that includes second information identifying the test result; and transmit the reply packet over the network.

* * * * *